United States Patent [19]

Watanabe et al.

[11] Patent Number: 5,519,199
[45] Date of Patent: May 21, 1996

[54] METHOD AND APPARATUS FOR DETECTING AND STORING BAR BODE DATA AND RE-DETECTING UNDETECTED DATA

[75] Inventors: Mitsuo Watanabe; Hiroaki Kawai; Shinichi Sato; Ichiro Shinoda, all of Kawasaki, Japan

[73] Assignee: Fujitsu Limited, Kawasaki, Japan

[21] Appl. No.: 307,450

[22] Filed: Sep. 21, 1994

[30] Foreign Application Priority Data

Dec. 20, 1993 [JP] Japan .................................. 5-320146

[51] Int. Cl.⁶ ........................................................ G06K 7/10
[52] U.S. Cl. .................................................. 235/463; 235/462
[58] Field of Search ...................... 235/463, 462

[56] References Cited

FOREIGN PATENT DOCUMENTS 0390162  10/1990  European Pat. Off. .
1519256  7/1978   United Kingdom .
8802521  4/1988   WIPO .

*Primary Examiner*—Donald T. Hajec
*Assistant Examiner*—Michael G. Lee
*Attorney, Agent, or Firm*—Armstrong, Westerman, Hattori, McLeland & Naughton

[57] ABSTRACT

This invention is intended to contribute to improvements of the reading accuracy of a bar code reader and performance of a POS system or the like. To attain this object, according to the invention, when one of the data blocks constituting a bar code cannot be detected, addresses of the non-detected data block are determined based on a width of the detected data block and addresses of the center bar. The invention is constituted such that data of the previously non-detected data block is detected based on its addresses.

14 Claims, 9 Drawing Sheets

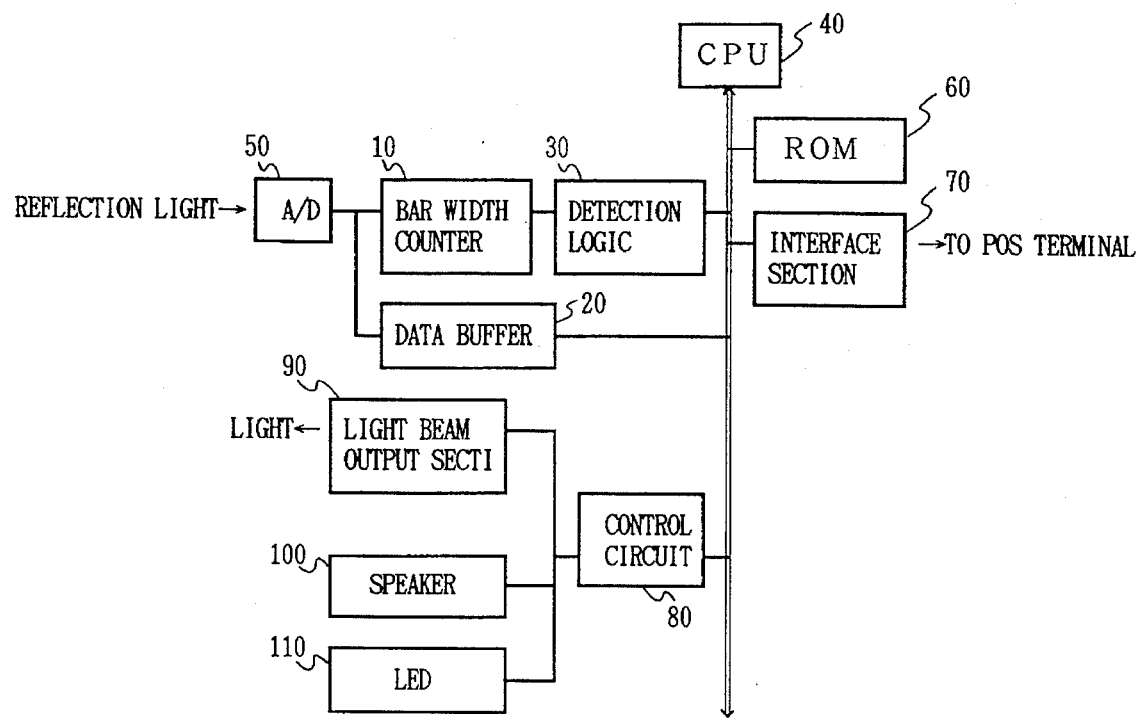
F I G. 3

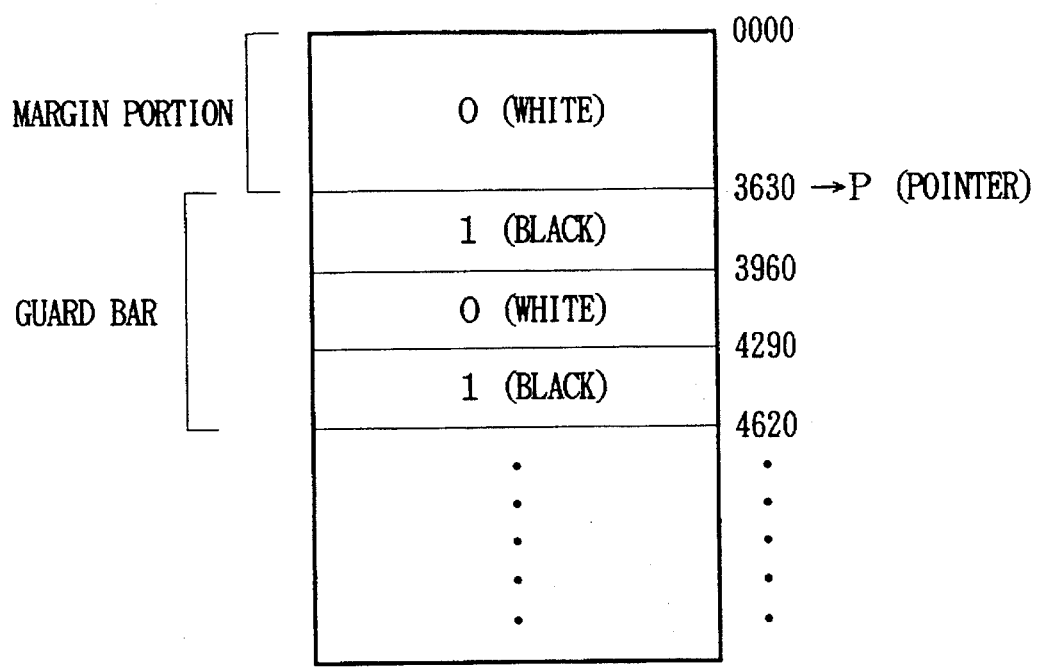
F I G. 5

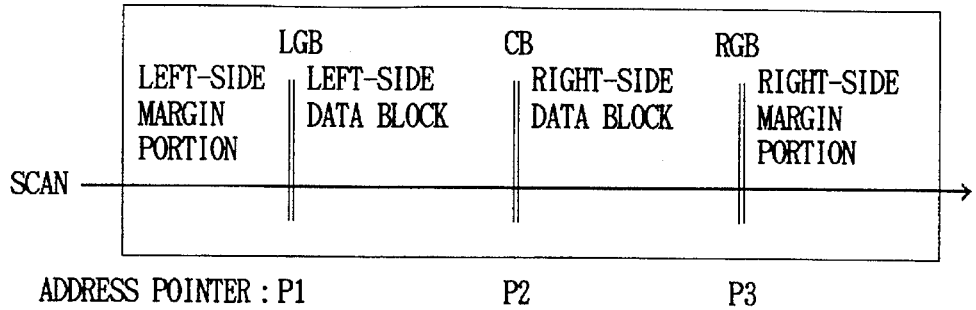
F I G. 8
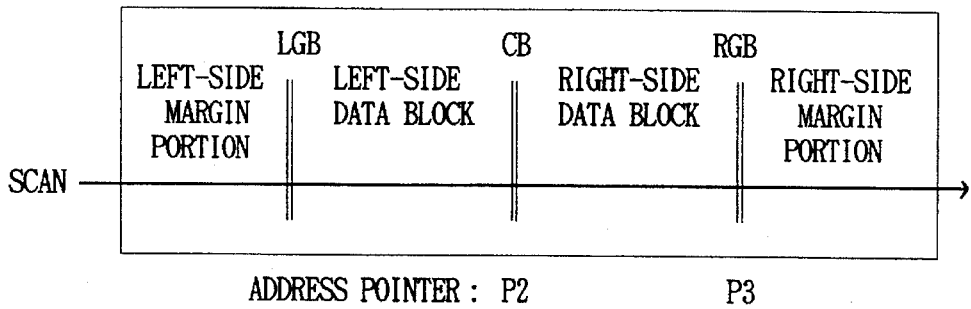
F I G. 9
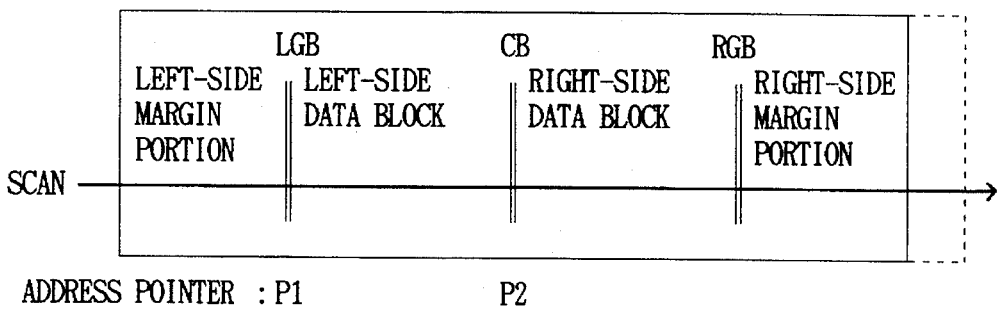
F I G. 10

METHOD AND APPARATUS FOR DETECTING AND STORING BAR BODE DATA AND RE-DETECTING UNDETECTED DATA

BACKGROUND OF THE INVENTION

1. Field of the Invention

The present invention relates to a method and apparatus for correctly detecting bar code data independently of surface noise or a printing method in a scanner device which reads bar code data by use of a reflected laser beam, for instance.

2. Description of the Prior Art

Recently, POS (point of sales) systems incorporating an automatic reading type register are widely employed instead of conventional key-in type registers in a variety of stores from major stores such as department stores and supermarkets to retail stores.

While the conventional key-in type register has only the function of calculating an amount of money of a customer's purchase immediately and correctly, the POS system has functions of calculating and adjusting amounts of money of purchases, and managing, in a unified manner, sales information, delivery and laying-in information, stock information, etc. of individual goods.

The POS system employs the bar code scheme for the input of an amount of money of a customer's purchase. According to the bar code scheme, a bar code representing a classification code that indicates attributes of each product is attached to it. When inputting an amount of money of a customer's purchase, a store clerk operates a bar code reader to read bar codes attached to respective products. The POS system judges prices of respective products based on classification codes as read by the bar code reader, and has the prices displayed on a display device of a POS terminal installed at a register counter. Further, the POS system calculates the total amount of money of the purchased products, and has it displayed on the display device of the POS terminal.

The bar code scheme not only saves a clerk the time and labor of inputting a classification code and a price of every product, but also prevents erroneous inputs. Further, the bar code scheme has the advantages that it can be implemented by a simple logic at a low cost, and that it can provide high reading accuracy because printed bars are a subject of reading.

The bar code reader is a device which illuminates a bar code with a light beam such as a laser beam, and judges widths of bars by analyzing the light reflected by the bars.

On the other hand, a format according to UPC (universal product code) is generally used for bar codes. UPC is compatible with JAN (Japanese article number) that is standardized in the JIS standard, and EAN (European article number) that is standardized in Europe.

UPC prescribes that a bar code should consist of 13 characters in the standard format and 8 characters in the contracted format. FIG. 11 shows the UPC's standard format consisting of 13 characters.

A bar code according to UPC has a left-side guide bar (LGB) and a right-side guide bar (RGB) at left and right end portions, respectively, and a center bar (CB) at a central portion. Further, UPC prescribes that a bar code should have margin portions which are wider than a particular width outside the left-side and right-side guide bars, respectively.

A group of six bar characters (hereinafter referred to as "left-side data block") written between the left-side guide bar (LGB) and the center bar (CB) according to UPC usually indicates a maker identification code of a product. On the other hand, right-side five bar characters (hereinafter referred to as "right-side data block") of another group of bar characters written between the center bar (CB) and the right-side guide bar (RGB) usually indicates a product item identification code, and the remaining one bar character indicates a modular check character.

A bar code reader can demodulate bar characters of the left-side and right-side data blocks into a prescribed data format only when it successfully scans the left-side and right-side margin portions and the left-side and right-side guide bars. More specifically, the bar code reader scans a bar code, detects bar widths of respective bar characters, and stores a data group of bar widths into a data buffer. Then, the bar code reader retrieves, in a predetermined direction, the bar width data group that is stored in the data buffer, and recognizes the left-side and right-side margin portions, the left-side and right-side guide bars and the center bar. That is, the bar code reader detects the positions of the margin portions, guide bars and center bar by retrieving the bar width data group based on the widths of the margin portions, guard bars and center bar that are prescribed by UPC. For example, when retrieving the bar width data group in the left-to-right direction of the bar code, the bar code reader sequentially recognizes the left-side margin portion, left-side guide bar (LGB), center bar (CB), right-side guide bar (RGB) and right-side margin portion. Then, the bar code reader judges whether the left-side data block exists between the left-side guard bar (LGB) and the center bar(CB), and whether the right-side data block exists between the center bar (CB) and the right-side guard bar (RGB). If there exist both of the left-side and right-side data blocks, the bar code reader demodulates the bar width data on a block-by-block basis.

Conventional bar code readers have a problem that when dirt or the like is attached to the left-side margin portion, they cannot detect the left-side margin portion and the left-side guard bar (LGB) and, therefore, cannot demodulate the bar width data of the left-side data block.

Further, when the width of the right-side margin portion is smaller than the prescribed value of UPC because of a product shape etc., conventional bar code readers cannot detect the right-side margin portion and the right-side guard bar (RGB) and, therefore, cannot demodulate the bar width data of the right-side data block.

SUMMARY OF THE INVENTION

An object of the present invention is to provide a bar code reader which can demodulate bar code data even when noise due to dirt or the like occurs in the margin portion of a bar code or when the margin portion is narrower than a particular width, to thereby contribute to improving the performance of POS systems and the like.

A bar code data detecting method and apparatus according to the invention will be summarized below.

Bar Code Data Detecting Method

Subjects of the bar code detecting method are bar codes in which two data blocks each including a particular number of bar characters are located between two guard bars with a center bar interposed between the two data blocks is a subject of the bar code data detecting method, more specifically, bar codes according to UPC (universal product code), EAN (European article number) and JAN (Japanese article number).

The bar code detecting method comprises the following steps:

(1) Bar width detecting step
(2) Data storing step
(3) Data block detecting step
(4) Address determining step
(5) Data block re-detecting step In the bar width detecting step of item (1), a bar code is scanned and bar widths of respective bar characters are detected.

In the data storing step of item (2), values of the bar widths as detected in the bar width detecting step are stored as addresses of the respective bar characters.

In the data block detecting step of item (3), a bar width data group stored in the data storing step is read out on a block-by-block basis.

The address determining step of item (4) is executed when one of the two data blocks could not be detected in the data block detecting step. The address determining step includes the process of determining addresses of the non-detected data block based on a width and addresses of the detected data block.

The data block re-detecting step of item (5) includes the process of detecting the previously non-detected data block based on the addresses determined in the address determining step.

A bar code according to the rules of standards such as above-mentioned UPC, JAN and EAN includes margin portions wider than particular widths outside the two respective guard bars. In this case, the data block detecting step is so constituted as to include the sub-step of retrieving the bar width data group stored in the bar width data storing step, and detecting addresses of the two respective margin portions, the sub-step of recognizing addresses of the two respective guard bars, the sub-step of recognizing addresses of the center bar, and the sub-step of determining the addresses of the two data blocks based on the addresses of the margin portions, the guard bars and the center bar.

In the bar code data detecting method of the invention, the address determining step is executed when one of the guard bars could not be detected due to noise etc. occurring in the margin portion of bar code data according to the rules of UPC etc., that is, when one of the data blocks could not be detected. In the address determining step, the addresses of the non-detected data block are determined based on the width and addresses of the detected data block. Then, in the bar code data detecting method, the data block re-detecting step is executed in which the previously non-detected data block is detected based on the addresses determined in the address determining step.

Next, the bar code data detecting apparatus according to the invention will be summarized.

Bar Code Data Detecting Apparatus

The bar code data detecting apparatus of the invention comprises a bar width detecting means, a bar width data storing means, a data block detecting means and an address determining means.

The bar width detecting means has a function of scanning a bar code and detecting bar widths of respective bar characters.

The bar width data storing means stores, as addresses of the bar characters, values of the bar widths detected by the bar width detecting means.

The data block detecting means has a function of detecting a bar width data group stored in the bar width data storing means on a block-by-block basis.

The address determining means has a function of determining, when the data block detecting means could not detect one of the two data blocks, addresses of a non-detected data block based on a width and addresses of a detected data block. The address determining means further has a function of informing the data block detecting means of the addresses of the non-detected data block to make it detect the non-detected data block.

If bar code data is the one according to above-mentioned UPC, JAN or EAN, the data block detecting means retrieves the bar code data group stored in the bar width data storing means, and detect addresses of the two margin portions, and recognizes addresses of the two guard bars and addresses of the center bar. Further, the data block detecting means determines addresses of the two data blocks based on the addresses of the margin portions, the guard bars and the center bar. When the data block detecting means could not recognize addresses of one of the two margin portions due to noise etc. occurring there, or when the data block detecting means could not recognize addresses of one of the two guard bars, the address determining means determines a width of the detected data block based on the addresses of the detected margin portion, the detected guard bar, and the center bar. Then, the address determining means determines the addresses of the non-detected margin portion or the non-detected guard bar based on the width of the detected data block and the addresses of the center bar. Then, the address determining means determines the addresses of the non-detected data block based on the addresses of the non-detected margin portion or the addresses of the non-detected guard bar, and informs the data block detecting means of the addresses of the non-detected data block thus determined.

The data block detecting means detects the previously non-detected data block by accessing the bar width data storing means based on the addresses sent from the address determining means.

According to the invention, even a bar code in which noise of dirt etc. is placed on the margin portion or the margin portion is narrower than a prescribed width can be read correctly. As a result, the invention can improve the reading accuracy of bar code readers.

BRIEF DESCRIPTION OF THE DRAWINGS

FIG. 3 is a block diagram showing a general configuration of a bar code data detecting apparatus according to a second embodiment;

FIG. 5 is a specific example of a data buffer of the second embodiment;

FIG. 8 is an image diagram showing a data block detecting process;

FIG. 9 shows example (1) of a bar code as a subject of reading;

FIG. 10 shows example (2) of a bar code as a subject of reading; and

DESCRIPTION OF THE PREFERRED EMBODIMENTS

An embodiment of the present invention will be hereinafter described with reference to the accompanying drawings.

Embodiment 1

Figure 1:
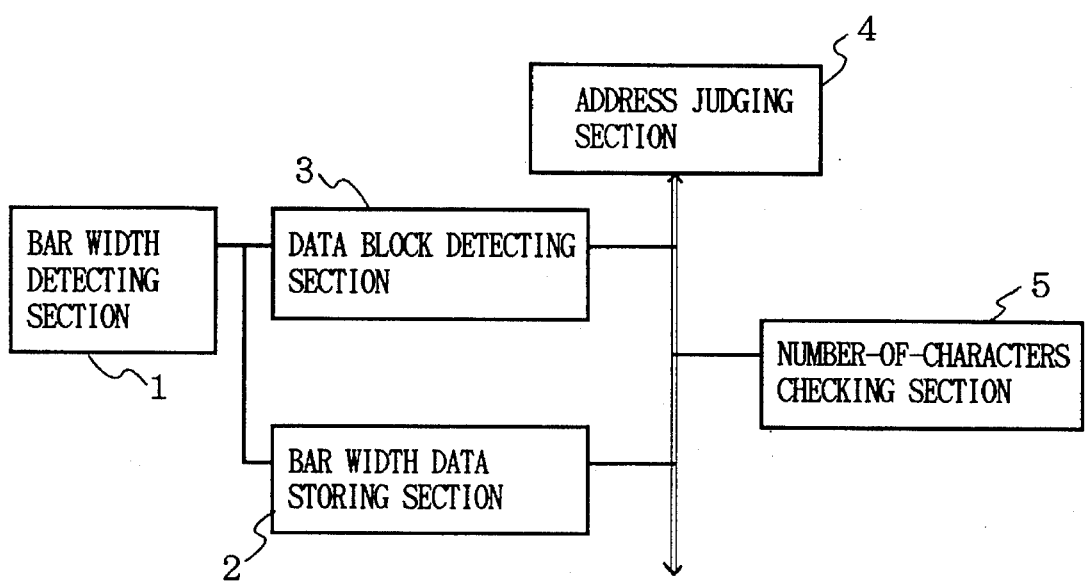
FIG. 1 is a block diagram showing a configuration of a bar code data detecting apparatus according to a first embodiment.

A bar code data detecting apparatus according to a first embodiment will be described with reference to FIG. 1.

The bar code data detecting apparatus has a bar width detecting section 1, a bar width data storing section 2, a data block detecting section 3 and an address judging section 4.

The bar width detecting section 1 scans a bar code and detects bar widths of respective bar characters.

The bar width data storing section 2 stores values of the bar widths detected by the bar width detecting section 1 as addresses of the respective bar characters.

The data block detecting section 3 retrieves the bar width data group stored in the bar width data storing section 2 on a block-by-block basis.

When the data block detecting section 3 cannot detect one of the two data blocks, the address judging section 4 determines addresses of the non-detected data block based on addresses of the detected data block. Then, the address judging section 4 informs the data block detecting section 3 of the addresses of the non-detected data block to make it detect the non-detected data block.

Where the bar code data is the one according to UPC, JAN or EAN, the data block detecting section 3 retrieves the bar width data group stored in the bar width data storing section 2, and detects addresses of the two margin portions. Then, the data block detecting section 3 recognizes addresses of the two guard bars. Further, the data block detecting section 3 recognizes addresses of the center bar, and recognizes addresses of the two data blocks based on the addresses of the center bar, margin portions and guard bars.

When the data block detecting section 3 cannot detect one of the two margin portions, or cannot recognize the addresses of one of the two guard bars, the address judging section 4 is activated.

The address judging section 4 determines the width of the data block based on the addresses of the margin portion or guard bar detected by the data block detecting section 3 and the addresses of the center bar. Further, the address judging section 4 determines the addresses of the non-detected margin portion or guard bar based on the width of the data block and the addresses of the center bar. In this manner, the address judging section 4 determines the addresses of the non-detected data block.

More specifically, when the end address of the detected data block coincides with the start address of the center bar, the address judging section 4 performs a counting operation on the width of the detected data block. The address judging section 4 updates the end address of the center bar by a value corresponding to the width of the detected data block, and recognizes the updated address as the end address of the non-detected data block. At the same time, the address judging section 4 recognizes the end address of the center bar as the start address of the non-detected data block. In this manner, the address judging section 4 can determine the addresses of the non-detected data block.

On the other hand, when the start address of the detected data block coincides with the end address of the center bar, the address judging section 4 performs a counting operation on the width of the detected data block. The address judging section 4 decreases the start address of the center bar by a value corresponding to the width of the detected data block, and recognizes the decreased address as the start address of the non-detected data block. At the same time, the address judging section 4 recognizes the start address of the center bar as the end address of the non-detected data block. In this manner, the address judging section 4 can determine the addresses of the non-detected data block.

The bar code data detecting apparatus further has a number-of-characters checking section 5 which counts, when the data block detecting section 3 detects a data block based on the information sent from the address judging section 4, the number of characters of the detected data block, and judges correctness of the number of characters.

Figure 2:
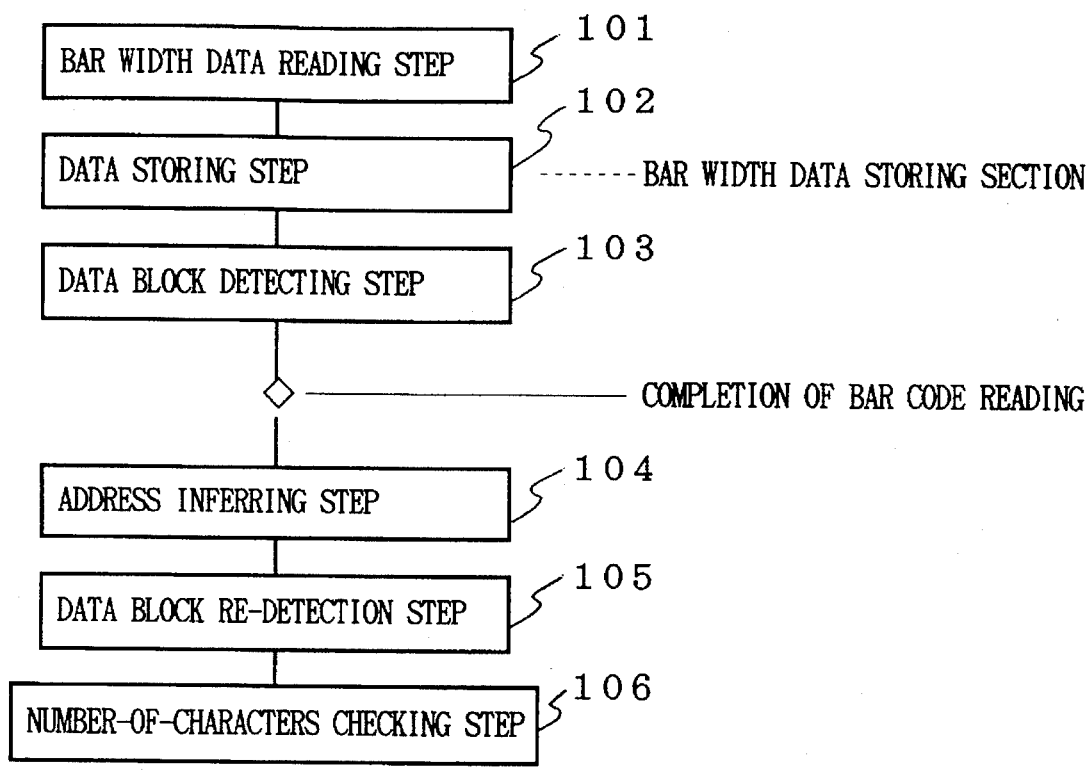
FIG. 2 shows an operation flow of the bar code data detecting apparatus according to the first embodiment.

The operation of the bar code data detecting apparatus will be hereinafter described with reference to a flowchart of FIG. 2.

To read a bar code, the bar width detecting section 1 of the bar code data detecting apparatus scans the bar code and reads bar widths of respective bar characters (step 101), and stores resulting bar width data into the bar width data storing section 2 (step 102).

Then, the data block detecting section 3 of the bar code data detecting apparatus searches the bar width data storing section 2 and detects the bar width data group on a block-by-block basis (step 103).

When the data block detecting section 3 has successfully detected both data blocks constituting the bar code, the reading of the bar code is finished. On the other hand, when the data block detecting section 3 could not detect one of the two data blocks, the address judging section 4 is activated.

The address judging section 4 determines addresses of a non-detected data block based on addresses of a detected data block (step 104), and informs the data block detecting section 3 of the addresses of the non-detected data block.

The data block detecting section 3 searches the bar width data storing section 2 based on the addresses supplied from the address judging section 4, and detects the non-detected data block (step 105).

The number-of-characters checking section 5 recognizes the number of bar characters constituting the non-detected data block now detected by the data block detecting section 3, and judges whether the number of bar characters is equal to the prescribed number (step 106).

If the number of characters of the non-detected data block is equal to the prescribed number, the reading of the bar code is finished. On the other hand, if the number of characters is not equal to the prescribed number, the process may be so constructed as to repeat steps 104 and 105.

In the following, the bar code data detecting apparatus will be described in more detail.

Embodiment 2

A second embodiment of the invention will be described with reference to the drawings.

This embodiment is directed to a bar code data detecting apparatus incorporated in a POS system. In this embodiment, it is assumed that a bar code according to UPC is used.

FIG. 3 is a block diagram showing a general configuration of a bar code data detecting apparatus of the embodiment.

As shown in FIG. 3, the bar code data detecting apparatus consists of the following components. A light beam output section 90 illuminates a bar code with a light beam such as a laser beam. An analog-digital converter (A/D) 50 receives a light signal reflected from the bar code, and performs conversion from an analog signal scheme to a digital signal scheme. A bar width counter 10 scans bar code data of the digital signal scheme as produced by the analog-digital converter (A/D) 50 in a predetermined direction, and detects bar widths of respective bar characters that constitute the bar code. A data buffer 20 sequentially stores the bar width data as detected by the bar width counter 10. A detection logic 30 retrieves the bar code data group in the data buffer 20 in a predetermined direction, and recognizes a left-side data block and a right-side data block that constitute the bar code. A CPU 40 demodulates the bar width data of the data blocks as detected by the detection logic 30 according to a program stored in a ROM 60. A speaker 100 and a LED 110 notifies a user whether the demodulation has been performed normally. An interface section 70 is an interface between the bar code detecting apparatus and a POS terminal. A control circuit 80 controls operations of the light beam output section 90, speaker 100 and LED 110 based on instructions from the CPU 40.

The respective components will be described below in detail.

The bar width counter 10, which is a specific example of the bar width detecting section 1 of the invention, has a function of performing a white/black judgment on the individual characters in accordance with the bar code scanning direction and, at the same time, performing a counting operation on the widths of the respective bar characters.

The data buffer 20, which is a specific example of the bar width data storing section 2 of the invention, sequentially stores in the scanning direction the bar width data as produced by the bar width counter 10 by counting.

The detection logic 30, which is a specific example of the data block detecting section 3 of the invention, has a function of retrieving the bar width data group stored in the data buffer 20 in the predetermined direction, detecting addresses of a start guard bar, a center bar and an end guard bar, and dividing the bar width data group into blocks of data. The start guard bar means a guard bar located next to a margin portion, and the end guard bar means a guard bar next to which a guard bar exists. More specifically, when a bar width data group is retrieved from the left side to the right side, the left-side guard bar (LGB) is the start guard bar and the right-side guard bar (RGB) is the end guard bar. Conversely, when a bar width data group is retrieved from the right side to the left side, the right-side guard bar (RGB) is the start guard bar and the left-side guard bar (LGB) is the end guard bar. The center bar (CB) of UPC can be detected irrespective of the retrieving direction.

Figure 4:
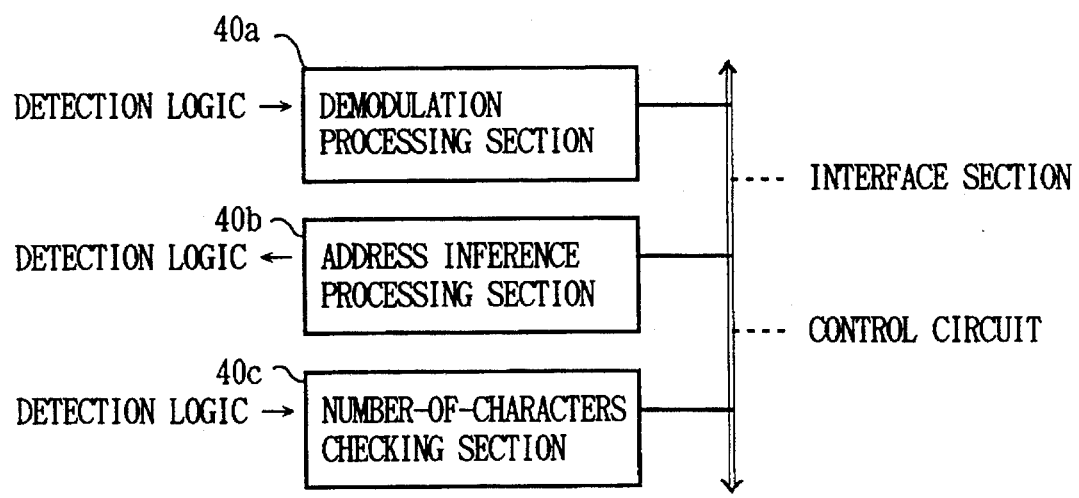
FIG. 4 is a block diagram showing a functional configuration of processes realized by a CPU.

The CPU 40 performs prescribed processing according to programs stored in the ROM 60. FIG. 4 is a functional block diagram showing processes realized by the CPU 40.

As shown in FIG. 4, processes of the CPU 40 include a demodulation processing section 40a, an address inference processing section 40a and a number-of-characters checking section 40c.

The demodulation processing section 40a demodulates, into a prescribed data format, the bar width data of each divided block as produced by the detection logic 30. That is, the demodulation processing section 40a demodulates the bar width data existing between the guard bar (GB) and the center bar (CB) based on the addresses of the guard bar (GB) and the center bar (CB) as detected by the detection logic 30.

When only one of the two data blocks is detected by the detection logic 30, the address inference processing section 40b infers addresses of the other data block, re-activates the detection logic 30 based on the inferred addresses, and makes the detection logic 30 judge whether the other data block exists at those addresses. More specifically, when the detection logic 30 has detected only one of the two guard bars (GB), the address inference processing section 40b infers addresses of the other guard bar (GB).

When the detection logic 30 has detected the other data block based on the addresses inferred by the address inference processing section 40b, the number-of-characters checking section 40c judges whether the number of characters of the other data block conforms to the rule of UPC.

FIG. 5 shows a specific example of the data buffer 20 of this embodiment.

The data buffer 20 sequentially stores the bar width data detected by the bar width counter 10 such that the bar width data values of the respective bar characters correspond to addresses.

For example, if the bar width of the head character in the scanning direction is 3,630 μm, this bar character has a start address of "0000" and an end address of "3630."

Figure 6:
FIG. 6 is a specific example of bar code data in the second embodiment.

FIG. 6 shows a format of a bar code as a subject of reading.

In a bar code of this embodiment, which is a standard version bar code according to the rules of UPC, bar characters each having a bar width of 2,310 μm are arranged on both sides of the center bar (CB) and the guard bars each having a width of 990 μm are added at both ends. Further, it is prescribed that the left-side margin portion having a width of not less than 3,630 μm should be provided outside the left-side guard bar (LGB) and the right-side margin portion having a width of not less than 2,310 μm should be provided outside the right-side guard bar (RGB).

In the following, the operation of the bar code data reading apparatus will be described for the case of reading the bar code shown in FIG. 6.

In this embodiment, it is assumed that bar code data is retrieved in the left-to-right direction.

Figure 7:
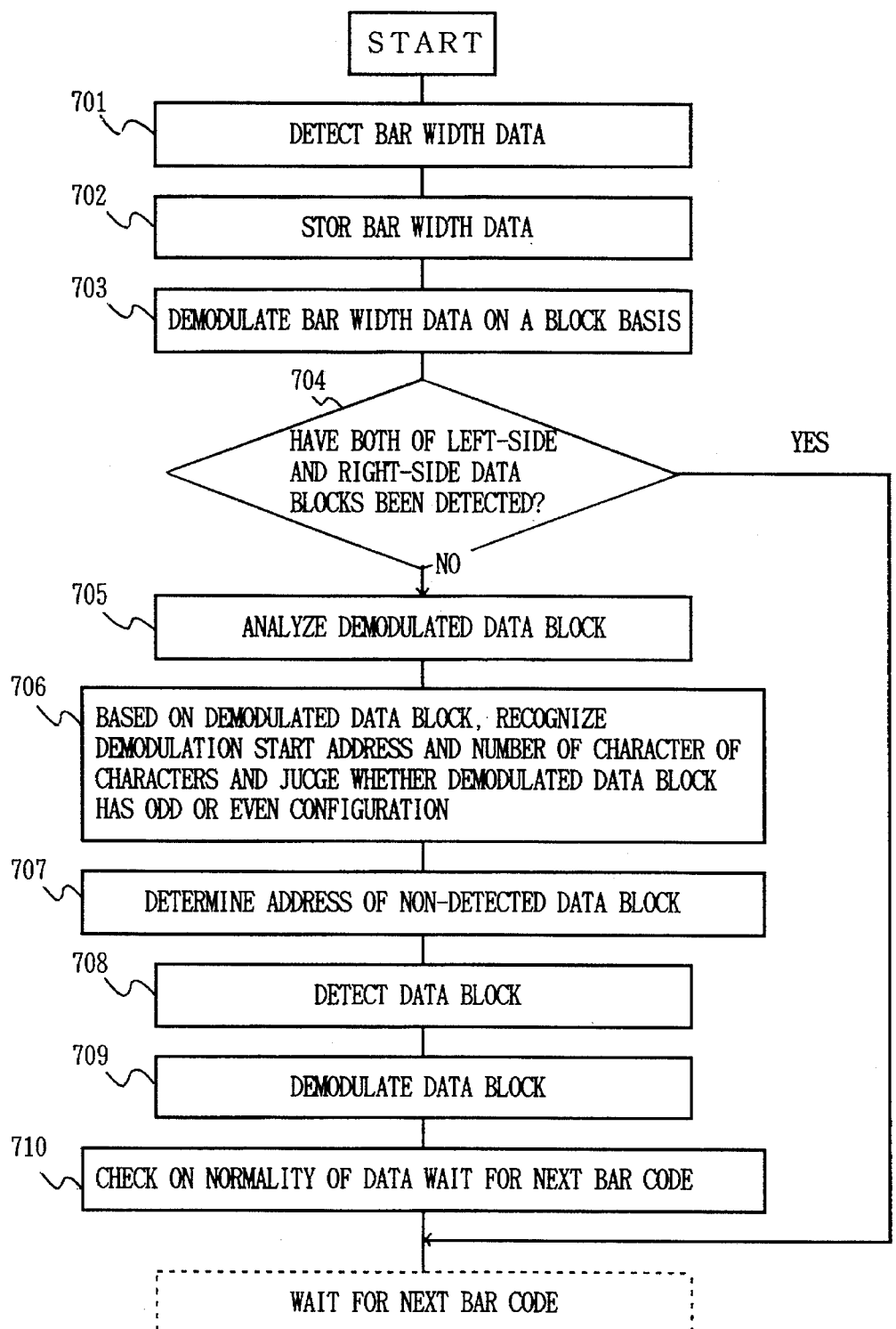
FIG. 7 is a flowchart showing the operation of the bar code data detecting apparatus.
Figure 11:
FIG. 11 is a specific example of a bar code according to the rules of UPC.

FIG. 7 is a flowchart showing the operation of the bar code data detecting apparatus of this embodiment.

Upon receiving a reflection light beam of a light beam impinging on a bar code, the analog-digital converter (A/D) 50 converts an analog signal of this light signal to a digital signal, which is input to the bar width counter 10.

The bar width counter 10 performs a counting operation on bar widths of respective bar characters (white, black) based on the input digital signal (step 701), and stores the counted bar widths into the data buffer 20 (step 702).

The detection logic 30 retrieves the bar width data group stored in the data buffer in the left-to-right direction of the bar code, and detects addresses of the left-side guard bar (LGB), center bar (CB) and right-side guard bar (RGB). Further, the detection logic 30 sets address pointers P1–P3 at the left-side guard bar (LGB), center bar (CB) and right-side guard bar (RGB), respectively (see FIG. 8), and informs the CPU 40 of these address pointers (P1, P2, P3).

When receiving the address pointers (P1, P2, P3) from the detection logic 20, the CPU 40 performs the following processing according to a program stored in the ROM 60.

First, the demodulation processing section 40a demodulates the bar width data group of the left-side data block based on the address pointers (P1, P2), and demodulates the bar width data group of the right-side data block based on the address pointers (P2, P3) (step 703).

When one guard bar (GB) of the left-side guard bar (LGB) and the right-side guard bar (RGB) has not been detected by the detection logic 30, the demodulation processing section 40a demodulates only the left-side data block or right-side data block and activates the address inference processing section 40b.

The address inference processing section 40b analyzes the one data block demodulated by the demodulation processing section 40a (steps 704 and 705). In this operation, the address inference processing section 40b recognizes the number of characters of the demodulated data block and the demodulation start address pointer, and judges whether the demodulated data block is of an odd configuration including both odd parity and even parity or of an even configuration including only even parity. Usually, a bar code according to UPC employs an odd-configuration left-side data block and an even-configuration right-side data block. Therefore, it can be judged whether the non-detected data block has an odd or even configuration by recognizing the odd/even configuration of the detected data block (step 706).

Then, the address inference processing section 40b infers addresses of the guard bar (GB) that has not been detected by the detection logic 30 based on the demodulation start address pointer and the number of characters, and sets an address pointer at the inferred addresses.

The detection logic 30 accesses data buffer 20 based on the address pointer set by the address inference section 40b and the address pointer of the center bar (CB), and judges whether there exists a data block between the center bar (CB) and the non-detected guard bar (GB). If there exists a data block, in the CPU 40 the number-of-characters checking section 40c counts the number of characters constituting the data block, and checks matching with the previously demodulated data block (step 709). If no abnormality is found in the number of characters, the demodulation processing section 40a demodulates the bar width data of the data block (step 710). After both of the left-side and right-side data blocks have been demodulated, the CPU 40 checks on the normality of the data based on the modular check character of the bar code. If no abnormality is found, the CPU 40 sends the demodulated data to the POS terminal.

Next, a detailed description will be made of the processing from step 703 to step 707.

FIG. 9 shows a specific example of a bar code having noise in the left-side margin portion. When attempting to read the bar code shown in FIG. 9, the bar width counter 10 and the detection logic 30 recognize noise in the left-side margin portion as a black bar, and cannot recognize it as a margin portion. As a result, the detection logic 30 cannot recognize the left-side guard bar (LGB), and detects only the center bar (CB) and the right-side guard bar (RGB). The detection logic 30 sets the address pointers P2 and P3 at the center bar (CB) and the right-side guard bar (RGB), respectively.

The demodulation processing section 40a demodulates only the right-side data block based on the address pointers P2 and P3, and activates the address inference processing section 40b.

The address inference processing section 40b analyzes the right-side data block as demodulated by the demodulation processing section 40a, and recognizes the number (i.e., 6) of characters, the odd/even configuration, and that the bar code retrieving direction is the left-to-right direction. Thus, the address inference processing section 40b recognizes that the bar code is of the UPC standard version. Then, the address inference processing section 40b infers that a left-side data block exists in addresses higher than the right-side data block based on the retrieving direction, and compares the address of the center bar (CB) with the end address of the data block that has been demodulated immediately before the right-side data block. That is, an agreement is found between the end address of the left-side data block and the address of the center bar (CB) when the left-side data block has been detected normally, and no agreement is found between those addresses when the left-side data block has not been detected.

When no agreement is found between those addresses, the address inference processing section 40b infers the address higher then the address of the center bar (CB) by the addresses corresponding to 6 characters, i.e., the address of the left-side guard bar (LGB), and sets the address pointer P1.

Then, the detection logic 30 accesses the data buffer 20, and judges whether there exists a data block between the address pointers P1 and P2. If there exists a left-side data block according to the rules of UPC, the detection logic 30 informs the number-of-characters checking section 40c of the address pointers P1 and P2. The number-of-characters checking section 40c judges whether the number of characters of the left-side data block existing between the address pointers P1 and P2 is the one (i.e., 6) according to the rule of UPC. Further, the CPU 40 detects bar width data of the head address of the left-side data block, and judges whether the detected width conforms to the rule of UPC. If both of the number of characters and the bar width conform to the rules of UPC, the CPU 40 activates the demodulation processing section 40a, and makes it sequentially demodulate the bar width data group of the left-side data block.

FIG. 10 shows a specific example of a bar code in which the right-side margin portion is narrower than a prescribed width. When attempting to read the bar code shown in FIG. 10, the bar width counter 10 and the detection logic 30 cannot recognize the right-side margin portion. As a result, the detection logic 30 cannot detect the right-side guard bar (RGB), and detects only the center bar (CB) and the left-side guard bar (LGB). The detection logic 30 sets the address pointers P1 and P2 at the left-side guard bar (LGB) and the center bar (CB), respectively.

The demodulation processing section 40a demodulates only the left-side data block based on the address pointers P1 and P2, and activates the address inference processing section 40b.

The address inference processing section 40b analyzes the left-side data block as demodulated by the demodulation processing section 40a, and recognizes the number (i.e., 6) of characters, the odd/even configuration, and that the bar code retrieving direction is the left-to-right direction (GB→CB). Thus, the address inference processing section 40b recognizes that the bar code is of the UPC standard version. Then, the address inference processing section 40b infers that a left-side data block exists in addresses lower than the left-side data block based on the retrieving direction, calculating the address that is lower than the address of the center bar (CB) by the addresses corresponding the number (i.e., 6) of characters, and compares the calculated address with the address that has been detected by the detection logic 30 as the end address of the data block to be demodulated after the left-side data block. That is, an agreement is found between the end address of the right-side data block and the address lower than the address of the center bar (CB) by the addresses corresponding to 6 characters when the right-side data block has been detected normally, and no agreement is found between those addresses when the right-side data block has not been detected.

When no agreement is found between those addresses, the address inference processing section 40b infers higher addresses corresponding to 6 characters, i.e., addresses of the left-side guard bar (LGB), based on the addresses of the center bar (CB), and sets the address pointer P1.

Then, the detection logic 30 accesses the data buffer 20, and judges whether there exists a data block between the address pointers P2 and P3. If there exists a right-side data block according to the rules of UPC, the detection logic 30 informs the number-of-characters checking section 40c of the address pointers P2 and P3. The number-of-characters checking section 40c judges whether the number of characters of the right-side data block existing between the address pointers P2 and P3 is the one (i.e., 6) according to the rule of UPC. Further, the CPU 40 detects bar width data of the tail address of the right-side data block, and judges whether the detected width conforms to the rule of UPC. If both of the number of characters and the bar width conform to the rules of UPC, the CPU 40 activates the demodulation processing section 40a, and makes it sequentially demodulate the bar width data group of the right-side data block.

As described above, according to this embodiment, even in the case of a bar code in which noise exists in the right-side margin portion or the width of the left-side margin portion is insufficient, both of the left-side and right-side data blocks can be detected and demodulated.

Although the above embodiment is described for the case in which bar width data is retrieved in the left-to-right direction, similar processing is performed for the case in which the retrieving is performed in the right-to-left direction.

According to this embodiment, a bar code in which noise or the like exists in a margin portion or a margin portion is narrower than a prescribed width can be read correctly.

What is claimed is:

1. A bar code data detecting method comprising:

a bar width detecting step of scanning a bar code in which two data blocks each including a particular number of bar characters are located between two guard bars with a center bar interposed between the two data blocks, and detecting bar widths of the respective bar characters;

a data storing step of writing bar width data as detected in the bar width detecting step to bar width data storing means for storing values of the bar widths as addresses of the bar characters;

a data block detecting step of detecting the bar width data on a block-by-block basis from a bar width data group written in the bar width data storing step;

an address determining step of determining, when one of the two data blocks constituting the bar code could not be detected in the data block detecting step, addresses of a non-detected data block based on a width and addresses of a detected data block; and a data block re-detecting step of accessing the bar width data storing means based on the addresses determined in the address determining step, and judging whether there exists the non-detected data block.

2. The bar code data detecting method according to claim 1, wherein the bar code data includes margin portions wider than particular widths outside the respective guard bars, and wherein the data block detecting step comprises the sub-steps of:

retrieving the bar width data group written in the bar width data storing step, and detecting addresses of the respective margin portions;

recognizing addresses of the respective guard bars;

recognizing addresses of the center bar; and determining the addresses of the two data blocks based on the addresses of the margin portions, the guard bars and the center bar.

3. The bar code data detecting method according to claim 2, wherein the address determining steps comprises the sub-steps of:

determining, when the addresses of one of the two margin portions could not be detected in the data block detecting step, a width of the non-detected data block based on the addresses of the detected margin portion and the addresses of the center bar;

determining the addresses of the non-detected margin portion based on the width of the detected data block and the addresses of the center bar; and determining the addresses of the non-detected data block based on the addresses of the non-detected margin portion.

4. The bar code data detecting method according to claim 2, wherein the address determining step comprises the sub-steps of:

recognizing, when the addresses of one of the two guard bars could not be detected in the data block detecting step, the width of the detected data block based on the addresses of the detected guard bar detected in the data block detecting step and the addresses of the center bar;

determining the addresses of the non-detected guard bar based on the width of the detected guard bar and the addresses of the center bar; and determining the addresses of the non-detected data block based on the addresses of the non-detected guard bar.

5. The bar code data detecting method according to claim 1, wherein the address determining step comprises the sub-steps of:

performing, when an end address of the detected data block coincides with a start address of the center bar, a counting operation on the width of the detected data block;

updating an end address of the center bar by a value corresponding to the width of the detected data block, and recognizing the updated address as an end address of the non-detected data block; and recognizing the end address of the center bar as a start address of the non-detected data block.

6. The bar code data detecting method according to claim 1, wherein the address determining step comprises the sub-steps of:

performing, when a start address of the detected data block coincides with an end address of the center bar, a counting operation on the width of the detected data block;

decreasing a start address of the center bar by a value corresponding to the width of the detected data block, and recognizing the decreased address as a start address of the non-detected data block; and recognizing the start address of the center bar as an end address of the non-detected data block.

7. The bar code detecting method according to claim 1, further comprising a number-of-characters checking step of counting the number of characters of the non-detected data block now detected in the data block re-detecting step, and judging whether the number of characters is equal to the particular number.

8. A bar code data detecting apparatus comprising:

bar width detecting means for scanning a bar code in which two data blocks each including a particular number of bar characters are located between two guard bars with a center bar interposed between the two data blocks, and detecting bar widths of the respective bar characters;

bar width data storing means for storing, as addresses of the bar characters, values of the bar widths detected by the bar width detecting means;

data block detecting means for retrieving a bar width data group stored in the bar width data storing means, and detecting the bar width data on a block-by-block basis;

address determining means for determining, when the data block detecting means could not detect one of the two data blocks constituting the bar code, addresses of a non-detected data block based on a width and addresses of a detected data block, and for informing the data block detecting means of the determined addresses to make it detect the non-detected data block.

9. The bar code data detecting apparatus according to claim 8, wherein the bar code data includes margin portions wider than particular widths outside the respective guard bars, and wherein the data block detecting means has functions of:

retrieving the bar width data group stored in the bar width data storing step, and detecting addresses of the two respective margin portions;

recognizing addresses of the two respective guard bars;

recognizing addresses of the center bar; and determining the addresses of the two data blocks based on the addresses of the margin portions, the guard bars and the center bar.

10. The bar code data detecting apparatus according to claim 9, wherein when the data block detecting means could not detect the addresses of one of the two margin portions have not been detected, the address determining means determines a width of the non-detected data block based on the addresses of the detected margin portion detected by the data block detecting means and the addresses of the center bar, determining the addresses of the non-detected margin portion based on the width of the detected data block and the addresses of the center bar, and determining the addresses of the non-detected data block.

11. The bar code data detecting apparatus according to claim 9, wherein when the data block detecting means could not detect the addresses of one of the two guard bars, the address determining means recognizing the width of the detected data block based on the addresses of the detected guard bar detected by the data block detecting means and the addresses of the center bar, determining the addresses of the non-detected guard bar based on the width of the detected guard bar and the addresses of the center bar, and determining the addresses of the non-detected data block based on the addresses of the non-detected guard bar.

12. The bar code data detecting apparatus according to claim 8, wherein when an end address of the detected data block coincides with a start address of the center bar, the address determining means performs a counting operation on the width of the detected data block, updating an end address of the center bar by a value corresponding to the width of the detected data block, recognizing the updated address as an end address of the non-detected data block, and recognizing the end address of the center bar as a start address of the non-detected data block.

13. The bar code data detecting apparatus according to claim 8, wherein when a start address of the detected data block coincides with an end address of the center bar, the address determining means performs a counting operation on the width of the detected data block, decreasing a start address of the center bar by a value corresponding to the width of the detected data block, making the decreased address a start address of the non-detected data block, and making the start address of the center bar an end address of the non-detected data block.

14. The bar code detecting apparatus according to claim 8, further comprising a number-of-characters checking means for counting, when the data block detecting means has detected the previously non-detected data block, the number of characters of the non-detected data block now detected, and judging whether the number of characters is equal to the particular number.

* * * * *